(12) United States Patent
Kumaran et al.

(10) Patent No.: US 8,799,503 B2
(45) Date of Patent: Aug. 5, 2014

(54) SYSTEM AND METHOD FOR DOWNLOADING CONTENT ASSOCIATED WITH OPTICAL MEDIA

(75) Inventors: O. R. Senthil Kumaran, Bangalore (IN); K. Sirisha Umapathy, Andhra Pradesh (IN)

(73) Assignee: Dell Products L.P., Round Rock, TX (US)

( * ) Notice: Subject to any disclaimer, the term of this patent is extended or adjusted under 35 U.S.C. 154(b) by 1108 days.

(21) Appl. No.: 12/342,732

(22) Filed: Dec. 23, 2008

(65) Prior Publication Data
US 2010/0161829 A1    Jun. 24, 2010

(30) Foreign Application Priority Data
Nov. 7, 2008   (IN) ............................ 2736/CHE/2008

(51) Int. Cl.
*G06F 15/16*    (2006.01)
(52) U.S. Cl.
USPC ............ 709/233; 709/204; 709/231; 709/240
(58) Field of Classification Search
USPC ....................................................... 709/233
See application file for complete search history.

(56) References Cited

U.S. PATENT DOCUMENTS

| 2006/0182007 A1 | 8/2006 | Konetski ................ 369/275.1 |
| 2009/0169180 A1* | 7/2009 | Shimada .................... 386/124 |
| 2009/0228520 A1* | 9/2009 | Yahata et al. ............ 707/104.1 |
| 2010/0011060 A1* | 1/2010 | Hilterbrand et al. ......... 709/204 |

FOREIGN PATENT DOCUMENTS

CN    1819049    8/2006    ............ G11B 20/10

* cited by examiner

*Primary Examiner* — Phuoc Nguyen
*Assistant Examiner* — Kishin G Belani
(74) *Attorney, Agent, or Firm* — Baker Botts L.L.P.

(57) ABSTRACT

Systems and methods for reducing problems and disadvantages associated with downloading content associated with optical media are disclosed. A method may include determining a size of an item of content to be downloaded. The method may also include determining a download speed of a network connection between an information handling system and a content provider and determining a fractional download size corresponding with a desired download time at the download speed of the network connection based at least on the download speed. The method may further include downloading a plurality of portions of the content from the content provider, each portion less than or substantially equal in file size than the fractional download size, wherein at least two of the plurality of portions are downloaded substantially in parallel, and combining each of the plurality of portions such that the combination is substantially similar to the item of content.

20 Claims, 2 Drawing Sheets

SYSTEM AND METHOD FOR DOWNLOADING CONTENT ASSOCIATED WITH OPTICAL MEDIA

CROSS REFERENCE TO RELATED APPLICATION

This application claims priority to Indian application number 2736/CHE/2008 filed Nov. 7, 2008, and entitled "System and Method for Downloading Content Associated with Optical Media," the contents of which is hereby incorporated by reference in its entirety.

TECHNICAL FIELD

The present disclosure relates in general to optical media, and more particularly downloading content associated with optical media.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems are often used in the entertainment industry. As a specific example, optical media has often been used to store audio and visual information. For instance, Compact Disc (CD) optical media, which interact with an infrared laser to store and read information, are commonly used to store music and/or other data. Similarly, Digital Versatile Disc (DVD) optical media, which interact with a red laser to store and read information, are commonly used to store movies for commercial sale, as well as other data. Recently, a new type of optical medium has been developed that uses a blue laser to read and write information, such as with the Blu-ray Disc (BD) or High Definition DVD specifications, for example. One advantage of blue laser media is that the smaller wavelength of the blue laser compared with the infrared and red lasers allows greater storage density for blue laser optical media. The greater storage media provides capacity to hold feature length High Definition movies and support desirable additional features, such as functions controlled by BD-Java (BD-J) applications running in connection with a Blu-ray Disc per the Blu-ray specification.

Such additional features may include user interactivity that allows a viewer of the blue laser media to download of promotional and other content from content providers. Content downloaded in connection with the blue laser media may often be High Definition content, and thus may include a file with a very large size. Using traditional download mechanisms, a download of files associated with these additional features may take a significant amount of time, thus negatively affecting the viewer experience.

SUMMARY

In accordance with the teachings of the present disclosure, the disadvantages and problems associated with downloading content associated with optical media have been substantially reduced or eliminated.

In accordance with one embodiment of the present disclosure, a method for downloading an item of content associated with an optical medium from a content provider is provided. The method may include determining a size of an item of content to be downloaded to an information handling system from a content provider. The method may also include determining a download speed of a network connection between the information handling system and the content provider. Additionally, the method may include determining a fractional download size corresponding with a desired download time at the download speed of the network connection based at least on the download speed of the network connection. The method may further include downloading a plurality of portions of the content from the content provider, each portion less than or substantially equal in file size than the fractional download size, wherein at least two of the plurality of portions are downloaded substantially in parallel. Moreover, the method may include combining each of the plurality of portions at the information handling system such that the combination is substantially similar to the item of content.

In accordance with another embodiment of the present disclosure, an article of manufacture may include a computer readable medium and computer-executable instructions carried on the computer readable medium, the instructions readable by a processor. The instructions, when read and executed, may causing the processor to: (i) determine a size of an item of content associated with an optical medium to be downloaded to an information handling system from a content provider; (ii) determine a download speed of a network connection between the information handling system and the content provider; (iii) based at least on the download speed of the network connection, determine a fractional download size corresponding with a desired download time at the download speed of the network connection; (iv) download a plurality of portions of the content from the content provider, each portion less than or substantially equal in file size than the fractional download size, wherein at least two of the plurality of portions are downloaded substantially in parallel; and (v) combine each of the plurality of portions at the information handling system such that the combination is substantially similar to the item of content.

In accordance with a further embodiment of the present disclosure, an information handling system may include a processor, a memory communicatively coupled to the processor, and computer-executable instructions carried on a computer readable medium, the instructions readable by the one or more processors. The instructions, when read and executed, may causing the processor to: (i) determine a size of an item of content associated with an optical medium to be downloaded to an information handling system from a content provider; (ii) determine a download speed of a network connection between the information handling system and the content provider; (iii) based at least on the download speed of the network connection, determine a fractional download size corresponding with a desired download time at the download speed of the network connection; (iv) download a plurality of portions of the content from the content provider, each portion less than or substantially equal in file size than the fractional download size, wherein at least two of the plurality of portions are downloaded substantially in parallel; and (v) combine each of the plurality of portions at the information handling system such that the combination is substantially similar to the item of content.

Other technical advantages will be apparent to those of ordinary skill in the art in view of the following specification, claims, and drawings.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
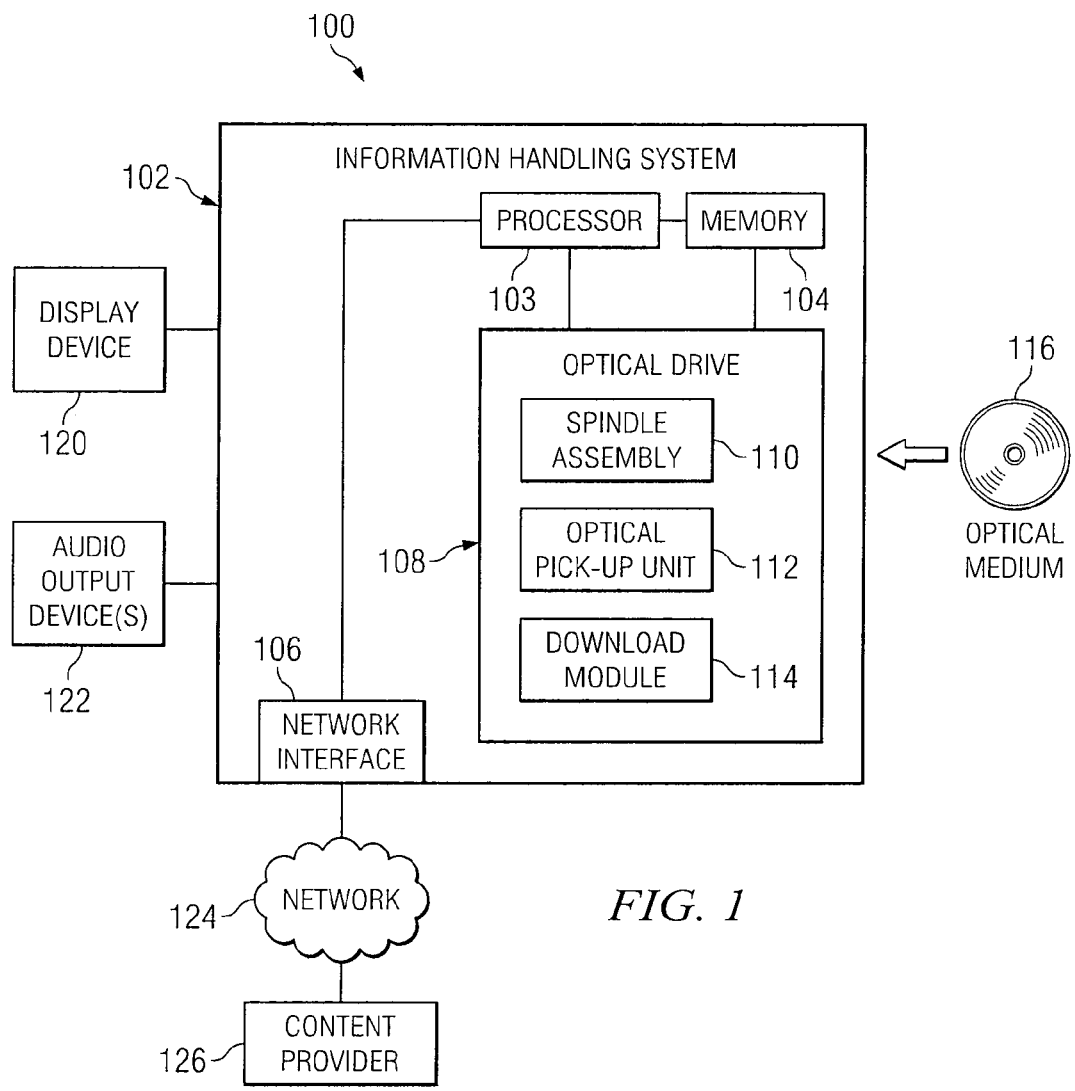
FIG. 1 illustrates a block diagram of an example system for downloading content associated with optical media, in accordance with certain embodiments of the present disclosure.
Figure 2:
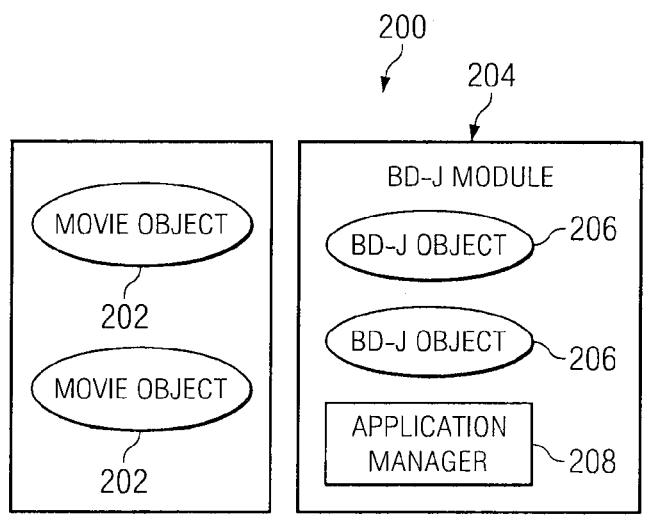
FIG. 2 illustrates an overview of the application structure of a BD-ROM in accordance with the Blu-ray specification.
Figure 3:
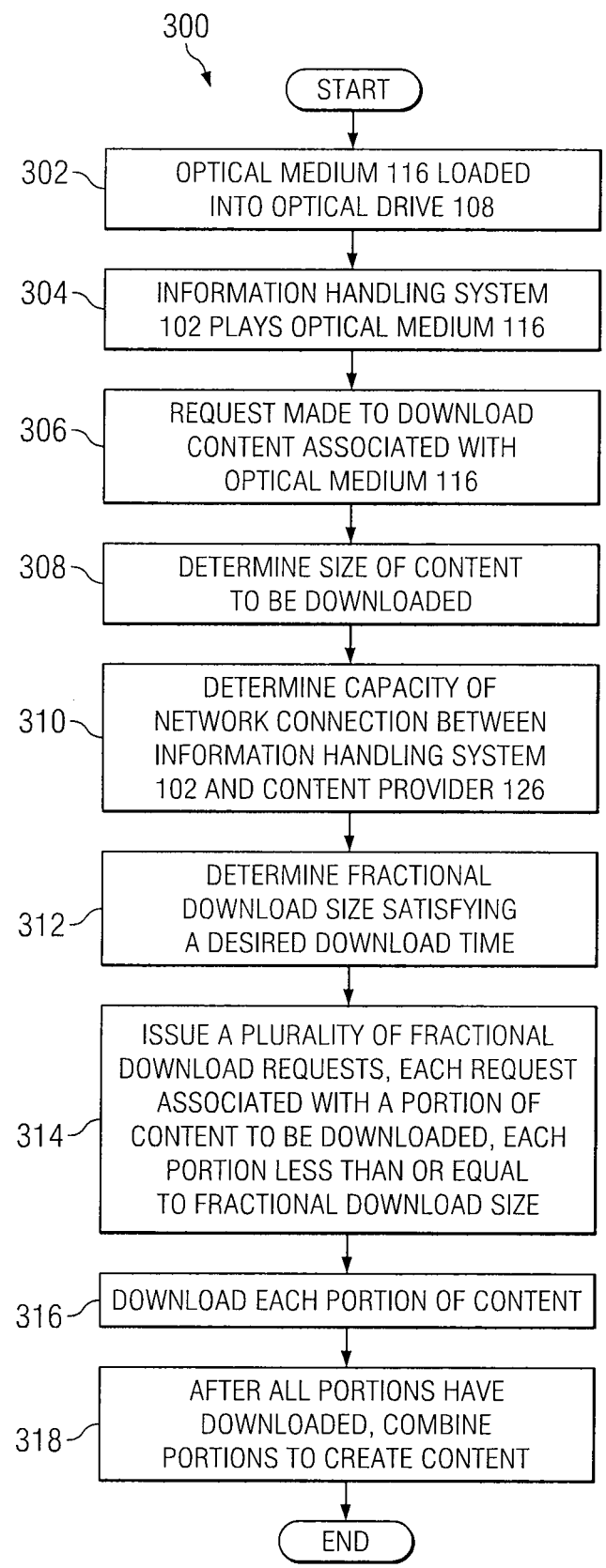
FIG. 3 illustrates a block diagram of an example method for downloading content associated with optical media, in accordance with certain embodiments of the present disclosure.

Preferred embodiments and their advantages are best understood by reference to FIGS. 1-3, wherein like numbers are used to indicate like and corresponding parts.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a PDA, a consumer electronic device, a network storage device, or any other suitable device and may vary in size, shape, performance, functionality, and price. The information handling system may include memory, one or more processing resources such as a central processing unit (CPU) or hardware or software control logic. Additional components or the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such wires, optical fibers, microwaves, radio waves, and other electromagnetic and/or optical carriers; and/or any combination of the foregoing.

FIG. 1 illustrates a block diagram of an example system 100 for downloading content associated with optical media. As depicted in FIG. 1, system 100 may comprise an information handling system 102, an optical medium 116, a display 120, one or more audio output devices 122, a network 124, and a content provider 126.

Information handling system 102 may generally be configured to read data from one or more optical media 116 received in optical drive 108 and process such data for display on display device 120 and/or output to audio output device(s) 122. Information handling system 102 may also be configured to read data from and/or communicate data to content provider 126 via network 124. In certain embodiments, information handling system 102 may be a computer, such as a desktop computer or portable computer (e.g., a "laptop" or "notebook"), for example. In other embodiments, information handling system 102 may be a optical media player, e.g. a Blu-ray Disc player or High Definition DVD player.

As depicted in FIG. 1, information handling system 102 may comprise a processor 103, a memory 104 communicatively coupled to processor 103, a network interface 106 communicatively coupled to processor 103, and an optical drive 108 coupled to processor 103 and/or memory 104.

Processor 103 may comprise any system, device, or apparatus configured to interpret and/or execute program instructions and/or process data, and may include, without limitation a microprocessor, microcontroller, digital signal processor (DSP), application specific integrated circuit (ASIC), or any other digital or analog circuitry configured to interpret and/or execute program instructions and/or process data. In some embodiments, each processor 103 may interpret and/or execute program instructions and/or process data stored in memory 104, optical drive 108 and/or another component of information handling system 102.

Memory 104 may be communicatively coupled to processor 103 and may comprise any system, device, or apparatus configured to retain program instructions or data for a period of time (e.g., computer-readable media). Each memory 104 may comprise random access memory (RAM), electrically erasable programmable read-only memory (EEPROM), a PCMCIA card, flash memory, magnetic storage, opto-magnetic storage, or any suitable selection and/or array of volatile or non-volatile memory that retains data after power to information handling system 102 is turned off.

Network interface 106 may be any suitable system, apparatus, or device configured to serve as an interface between information handling system 102 and network 124. Network interface 106 may enable information handling system 102 to communicate over network 124 using any suitable transmission protocol and/or standard, including without limitation all transmission protocols and/or standards enumerated below with respect to the discussion of network 124.

Optical drive 108 may be any suitable system, apparatus, or device configured to read data from and/or write data to an optical storage medium such as optical medium 116, for example. In certain embodiments, optical drive 108 may use laser light or other electromagnetic energy to read and/or write data to an optical medium. As depicted in FIG. 1, optical drive 108 may include spindle assembly 110, optical pick-up unit 112, and download module 114. Spindle assembly may be any suitable system, apparatus, or device configured to spin optical medium 116 proximate to optical pick-up unit 112. Optical pick-up unit 112 may include a laser or other source of electromagnetic energy (e.g., a blue laser for interacting with BD media) which may illuminate optical medium 116 to read information stored on optical medium 116 and/or write information to optical medium 116. Information read from optical medium 116 may be processed within optical drive 108, processor 103, and/or another component of information handling system 102 to produce audio and/or display signals (e.g., for output to display device 120 and/or audio output device(s) 122) representing the information stored on optical medium 116.

Download module 114 may manage downloading of content associated with optical medium 116. As discussed above, some optical media may include and/or support additional features, including allowing a viewer of the optical media to download content associated with optical medium 116. Download module 114 may be any suitable system, apparatus, or device that manages and/or facilitates the downloading of such content, as described in greater detail below. Download module 114 may be embodied in hardware, software, firmware, or any combination thereof. In certain embodiments, download module 114 may include firmware and/or software instructions configured to execute on a processing component within optical drive 108, as depicted in FIG. 1. In other embodiments, download module 114 may include firmware and/or software instructions configured to execute on a processing component of a component of information handling system 102 not within optical drive 108. In yet other embodiments, download module may include a program of instructions stored on optical medium 116 and retrieved to be executed in optical drive 108, such as a BD-J application of the BD specification, for example.

Optical medium 116 may include any system, apparatus, or device that may retain data and/or instructions for a period of time, wherein data and/or instructions may be read from and/or written to optical medium 116 by use of a laser or other source of electromagnetic energy. In certain embodiments, optical medium 116 may include a flat, circular disc (an optical disc, such as a CD, DVD, or blue laser medium, for example) wherein data is stored in the "pits" or "bumps" in the flat surface, such that the pits may distort incident laser light.

Display device 120 may include any system, apparatus, or device suitable for creating graphic images and/or alphanumeric characters recognizable to a user, and may include, for example, a liquid crystal display (LCD), cathode ray tube (CRT), a plasma screen, and a digital light processor (DLP) projection monitor. In certain embodiments, display device 120 may include a computer monitor. In other embodiments, display device 120 may include a television.

Audio output device(s) 122 may include any system, apparatus, or device suitable for outputting sound signals generated by information handling system 102, for example, music, soundtracks, and/or sounds stored on optical medium 116. In certain embodiments, audio output device(s) 122 may include one or more speakers and an audio driver operable to control the one or more speakers. Audio output device 112 may include any suitable type of speaker, such as a cone or ribbon-based loudspeaker, for example. Audio output device 112 may comprise any audio driver or other program or device that controls the operation of a speaker. The audio driver may act as a translator between processor 102 and audio output device 112.

Network 124 may be a network and/or fabric configured to communicatively couple information handling system 102 to content provider 126. Network 124 may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet or any other appropriate architecture or system that facilitates the communication of signals, data and/or messages (generally referred to as data). Network 124 may transmit data using any storage and/or communication protocol, including without limitation, Fibre Channel, Frame Relay, Asynchronous Transfer Mode (ATM), Internet protocol (IP), other packet-based protocol, small computer system interface (SCSI), Internet SCSI (iSCSI), Serial Attached SCSI (SAS) or any other transport that operates with the SCSI protocol, advanced technology attachment (ATA), serial ATA (SATA), advanced technology attachment packet interface (ATAPI), serial storage architecture (SSA), integrated drive electronics (IDE), and/or any combination thereof. Network 124 and its various components may be implemented using hardware, software, or any combination thereof.

Content provider 126 may include any system, apparatus, or device operable to communicate with information handling system 102 via network 124 in order to deliver content to information handling system 102 for viewing by a user thereof. For example, content provider 126 may include a website, FTP site, and/or similar site that may communicate content to information handling system 102. Content communicated by content provider 126 may include, without limitation, audio, video (e.g., high-definition video), data, games, and/or any other file or collection of files.

FIG. 2 illustrates an overview of the application structure 200 of a BD-ROM in accordance with the Blu-ray specification. Application structure 200 or an application or data structure similar thereto, may be representative of applications and/or data stored on an optical medium, e.g. optical medium 116. Accordingly, the discussion of application structure 200 is exemplary, and any suitable application structure may be used to implement the methods and systems described herein.

As shown in FIG. 2, application structure 200 may include one or movie objects 202 and Blu-ray Disc Java (BD-J) module 204. Each of movie objects 202 may include executable instructions or navigation commands. For example, navigation commands in a movie object 202 may launch video and/or audio playback, another movie object 202, a BD-J object 206, and/or access other data or applications stored on a BD-ROM.

BD-J module 204 may include one or more executable programs operable to implement interactive features, advanced content, and/or other features associated with an optical medium 116. As depicted in FIG. 2, BD-J module 204 may include one or more BD-J objects 206 and an application manager 208. Each BD-J object 206 may include a table of Java applications or command programs known as "xlets" that may trigger playlist playback, other movie objects 202, BD-J objects 206, and/or Java programs. Each xlet may be controlled and/or managed by application manager 208 (e.g., application manager 208 may maintain a table, database, or other data structure used to keep track of executed xlets).

Although FIG. 2 depicts application structure 200 including particular elements, application structure 200 may include any other suitable components, in accordance with the BD-ROM specification or other suitable specification. In addition, BD-ROM application structure 200 depicted in FIG. 2 may be applied to embodiments set forth herein for purposes of exposition, and any suitable optical medium application structure may be applied to embodiments set forth herein.

In certain embodiments, download module 114 of system 100 may include BD-J module 204, one or more components thereof, or a module of executable instructions similar to BD-J module 204. For example, a BD-J module 204 or one or more components thereof may load from an optical medium 116 placed in optical drive 108 and perform one or more of the functions of download module 114, as described in greater detail herein.

FIG. 3 illustrates a block diagram of an example method 300 for downloading content associated with optical media, in accordance with certain embodiments of the present disclosure.

According to one embodiment, method 300 preferably begins at step 302. As noted above, teachings of the present disclosure may be implemented in a variety of configurations of system 100. As such, the preferred initialization point for method 300 and the order of the steps 302-318 comprising method 300 may depend on the implementation chosen.

At step 302, optical medium 116 may be loaded into optical drive 108. For example, a user of information handling system may manually load optical medium 116 into optical drive 108. In other embodiments, optical medium 116 may be automatically loaded into optical drive 108 (e.g., from a disc magazine).

At step 304, information handling system 102 may play optical medium 116 and load data and/or executable programs stored thereon in any suitable manner.

At step 306, a request may be made to download an item of content associated with optical medium 116 from content provider 126. For example, such request may be made by a user of information handling system 102 by selecting a menu option after optical medium 116 has started playing (e.g., the user's selection of additional and/or advanced features associated with optical medium 116). In other embodiments, such request may be made automatically, as part of automatic playing of optical medium 116.

At step 308, download module 114 and/or another component of information handling system 102 may determine the total size of the content to be downloaded from content provider 126. Such determination may be made in any suitable manner, including without limitation, a BD-J xlet and/or other set of executable instructions configured to request from content provider 126 the size of the content to be downloaded.

At step 310, download module 114 and/or another component of information handling system 102 may determine the capacity (e.g., download speed) of the network connection between information handling system 102 and content provider 126. Such determination may be made in any suitable manner, including without limitation, a BD-J xlet and/or other set of executable instructions (e.g., Internet Speed Test) configured to request from content provider 126 the size of the content to be downloaded.

At step 312, download module 114 and/or another component of information handling system 102 may, based at least on the capacity of the network connection, determine a fractional download size. Such determination may be made in any suitable manner, including without limitation, a BD-J xlet and/or other set of executable instructions configured to determine a fractional download size in accordance with the present disclosure. The determined fractional download size may be such that a file of the fractional download size (or smaller) would be expected to download within a desired download time, given the capacity of the network connection. For example, if the capacity of the network connection is determined to be a 512 kilobit-per-second (Kbps) connection, and it is desired that downloads not exceed two minutes, download module 114 and/or another component of information handling system may determine the fractional download size to be 7.5 megabytes (MB) or less.

The desired download time may be determined in any suitable manner. For example, the desired download time may be predetermined by the author and/or creator of optical medium 116 and/or stored as data thereon that may be read during execution of method 300. An another example, the desired download time may be determined automatically by information handling system 102, one or more of its components, and/or an operating system executing thereon based on one or more parameters and/or physical properties associated with information handling system 102 and/or its individual components. As a further example, the desired download time may be determined by a user of information handling system 102, e.g., in accordance with personal preference.

At step 314, download module 114 and/or another component of information handling system 102 may issue a plurality of fractional download requests, each fractional download request including a request to download a respective portion of the content to be downloaded such that each portion is less than or approximately equal in file size to the determined fractional download size. For example, if the content to be downloaded has a size of 300 MB, and the determined fractional download size is 100 MB, download module 114 and/or another component of information handling system 102 may issue three fractional download requests, wherein each request includes a request to download a respective 100 MB-portion of the content to be downloaded. As another example, if the content to be downloaded has a size of 360 MB, and the determined fractional download size is 100 MB, download module 114 and/or another component of information handling system 102 may issue four fractional download requests, wherein each request includes a request to download a respective 90 MB-portion of the content to be downloaded. Although the specific examples set forth above contemplate that each fractional download request includes a request to download an identically-sized or similarly-sized portion, the sizes of the content portions may be differently-sized. In certain embodiments, one or more of the portions may download substantially in parallel.

In BD-J embodiments of download module 114, each of the fractional download requests may include an xlet, wherein an application manager (e.g., application manager 208) manages (e.g., via entries in an application management table) the execution of the individual fractional download xlets. For example, application manager 208 may maintain the completion status of each fractional download request xlet and/or the portion of content associated with each fractional download request xlet.

At step 316, download module 114 and/or another component of information handling system 102 may download each portion of content from content provider 126. In some embodiments, one or more portions of content may be downloaded substantially in parallel. Such download may occur via one or more HTTP connections, FTP connections, or any other suitable connection. Downloaded content may be stored in one or more components of information handling system 102, including without limitation optical media 116.

At step 318, after all portions of content associated with the fractional download requests have completed, download module 114 and/or another component of information handling system 102 may appropriately combine the individual portions to store (e.g., in memory 103 and/or another component of information handling system 102) the content for use by information handling system 102. IN BD-J implementations, such combination and/or storing may be made in any suitable manner, including without limitation, a BD-J xlet and/or other set of executable instructions configured to reassemble the individual portions after such portions have completed downloading.

Although FIG. 3 discloses a particular number of steps to be taken with respect to method 300, method 300 may be executed with greater or lesser steps than those depicted in FIG. 3. In addition, although FIG. 3 discloses a certain order of steps to be taken with respect to method 300, the steps comprising method 300 may be completed in any suitable order.

Method 300 may be implemented using system 100 or any other system operable to implement method 300. In certain embodiments, method 300 may be implemented partially or fully in software embodied in computer-readable media.

Using the methods and systems disclosed herein, problems associated with conventional approaches to downloading content associated with an optical medium may be improved, reduced, or eliminated. For example, methods and systems disclosed herein may leverage functionality present in an optical medium to facilitate faster download of content by dividing an item of content into multiple portions or threads and downloading such portions in parallel, thus potentially reducing download times and potentially improving user experience.

Although the present disclosure has been described in detail, it should be understood that various changes, substitutions, and alterations can be made hereto without departing from the spirit and the scope of the disclosure as defined by the appended claims.

What is claimed is:

1. A method for downloading an item of content associated with an optical medium from a content provider, comprising:
   determining a size of an item of content to be downloaded to an information handling system from a content provider;
   determining a download speed of a network connection between the information handling system and the content provider;
   based at least on the download speed of the network connection, determining a fractional download size corresponding with a desired download time at the download speed of the network connection;
   downloading a plurality of portions of the content from the content provider, each portion less than or substantially equal in file size than the fractional download size, wherein at least two of the plurality of portions are downloaded substantially in parallel; and
   combining each of the plurality of portions at the information handling system such that the combination is substantially similar to the item of content.

2. A method according to claim 1, further comprising executing one or more programs of instructions embodied on a computer-readable medium, the one or more programs of instructions each operable to, when executed, download one of the plurality of portions of the content from the content provider.

3. A method according to claim 2, wherein the one or more programs of instructions comprise a Java-based application.

4. A method according to claim 3, wherein the Java-based application is a Blu-ray Disc Java (BD-J) application.

5. A method according to claim 3, wherein the Java-based application is an xlet.

6. A method according to claim 2, wherein the one or more programs of instructions is managed by a Blu-ray Disc Java (BD-J) application manager.

7. A method according to claim 1, wherein the optical medium is a Blu-ray Disc.

8. An article of manufacture comprising:
   a non-transitory computer readable medium; and
   computer-executable instructions carried on the non-transitory computer readable medium, the instructions readable by a processor, the instructions, when read and executed, for causing the processor to:
   determine a size of an item of content associated with an optical medium to be downloaded to an information handling system from a content provider;
   determine a download speed of a network connection between the information handling system and the content provider;
   based at least on the download speed of the network connection, determine a fractional download size corresponding with a desired download time at the download speed of the network connection;
   download a plurality of portions of the content from the content provider, each portion less than or substantially equal in file size than the fractional download size, wherein at least two of the plurality of portions are downloaded substantially in parallel; and
   combine each of the plurality of portions at the information handling system such that the combination is substantially similar to the item of content.

9. An article of manufacture according to claim 8, wherein the computer-executable instructions comprise a Java-based application.

10. An article of manufacture according to claim 9, wherein the Java-based application is a Blu-ray Disc Java (BD-J) application.

11. An article of manufacture according to claim 9, wherein the Java-based application is an xlet.

12. An article of manufacture according to claim 8, wherein the computer-executable instructions is managed by a Blu-ray Disc Java (BD-J) application manager.

13. An article of manufacture according to claim 8, wherein the optical medium is a Blu-ray Disc.

14. An information handling system comprising:
   a processor;
   a memory communicatively coupled to the processor; and
   computer-executable instructions carried on a computer readable medium, the instructions readable by the one or more processors, the instructions, when read and executed, for causing the one or more processors to:
   determine a size of an item of content associated with an optical medium to be downloaded to an information handling system from a content provider;
   determine a download speed of a network connection between the information handling system and the content provider;
   based at least on the download speed of the network connection, determine a fractional download size corresponding with a desired download time at the download speed of the network connection;
   download a plurality of portions of the content from the content provider, each portion less than or substantially equal in file size than the fractional download size, wherein at least two of the plurality of portions are downloaded substantially in parallel; and
   combine each of the plurality of portions at the information handling system such that the combination is substantially similar to the item of content.

15. An information handling system according to claim 14, wherein the computer-executable instructions comprise a Java-based application.

16. An information handling system according to claim 15, wherein the Java-based application is a Blu-ray Disc Java (BD-J) application.

17. An information handling system according to claim 15, wherein the Java-based application is an xlet.

18. An information handling system according to claim 14, wherein the computer-executable instructions is managed by a Blu-ray Disc Java (BD-J) application manager.

19. An information handling system according to claim 14, wherein the optical medium is a blue laser optical medium.

20. An information handling system according to claim 19, wherein the optical medium is a Blu-ray Disc.

* * * * *